July 17, 1962     G. E. DRAKEFORD ETAL     3,044,522
PNEUMATIC TYRE COVERS

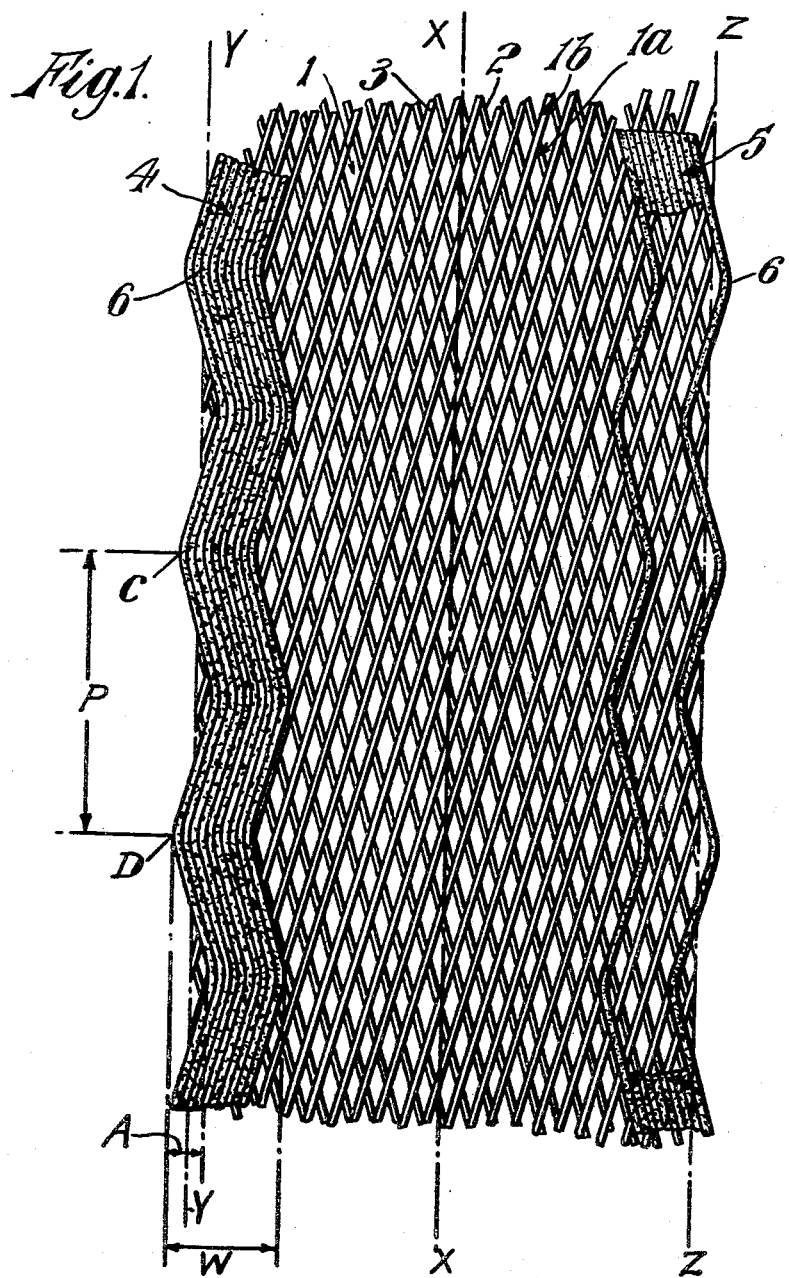

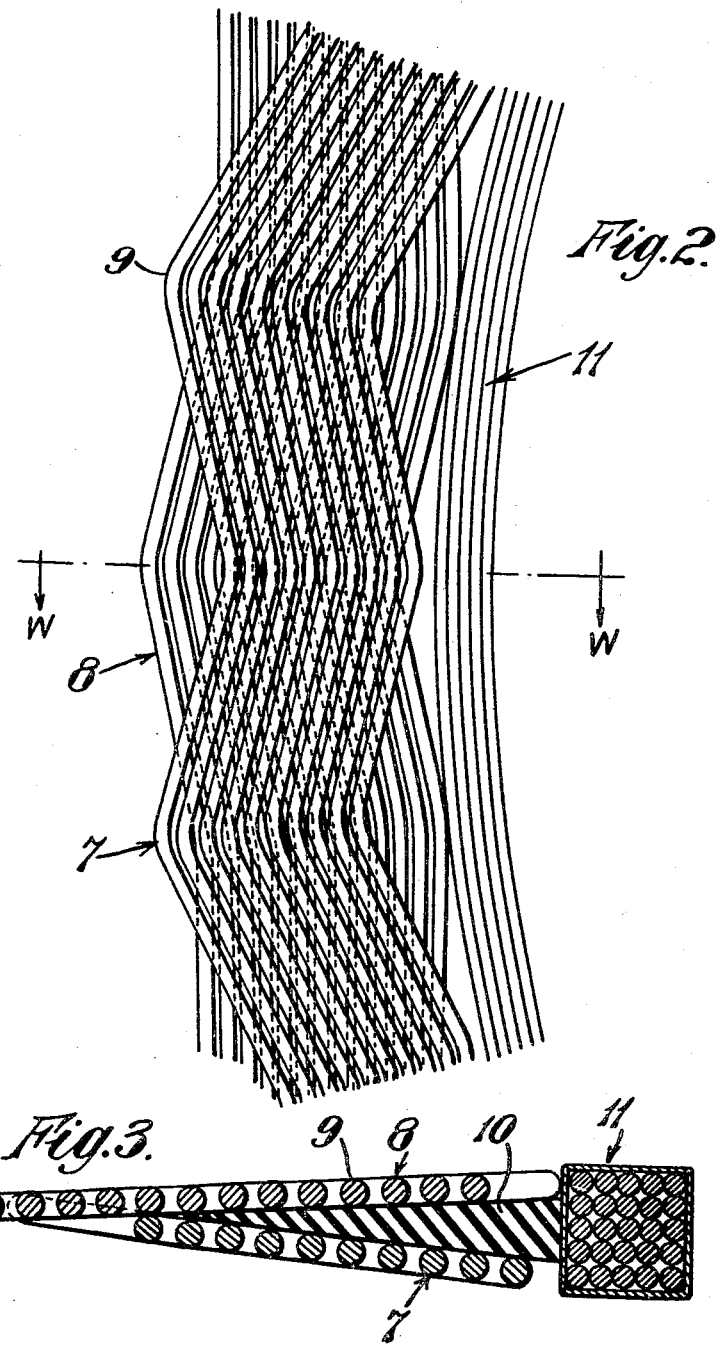

Filed June 30, 1958     3 Sheets-Sheet 3

INVENTOR.
GEORGE EDWARD DRAKEFORD
FRANCIS EDMUND SMITH
BY

Benj. T. Rauber
ATTORNEY

United States Patent Office 3,044,522
Patented July 17, 1962

3,044,522
PNEUMATIC TYRE COVERS
George Edward Drakeford, Walmley, Sutton Coldfield, and Francis Edmund Smith, Sutton Coldfield, England, assignors to Dunlop Rubber Company Limited, London, England, a British company
Filed June 30, 1958, Ser. No. 745,736
Claims priority, application Great Britain July 10, 1957
7 Claims. (Cl. 152—355)

This invention relates to pneumatic tyre covers and to breakers, fillers and chafers for pneumatic tyre covers.

It is an object of the present invention to provide an improved breaker, filler or chafer for a pneumatic tyre cover.

It is a further object of the present invention to provide an improved pneumatic tyre cover.

According to the invention a breaker filler or chafer for a tyre carcass comprises an annular layer formed from a plurality of sinuous convolutions of filamentary material extending parallel to each other in side-by-side relationship, each convolution incorporating a plurality of sinuations and the general direction of each convolution being substantially circumferential.

According to the invention, also, a pneumatic tyre cover comprises a carcass incorporating a breaker, filler or chafer as defined in the preceding paragraph.

The term "sinuation," where used in this specification, means a substantially smoothly curved length of filamentary material such as that lying between the points C and D in FIGURE 1 of the accompanying drawings, which is a diagrammatic plan view showing the arrangement of cords in a breaker construction. The "pitch" of a sinuation is the shortest distance between the two points at which the sinuation begins and ends respectively (see "P," FIGURE 1), and the amplitude of the sinuation is the total transverse extent of the length of filamentary material in the sinuation (see "A," FIGURE 1).

A breaker, filler of chafer comprises sinuations of filamentary material extending substantially circumferentially of a tyre carcass in "convolutions" a convolution being one complete circuit of the tyre carcass.

The breaker takes the form of a band but the filler or chafer takes the form of a flat ring. In all cases, the amplitude of each sinuation is less than the width of the annular layer.

A pneumatic tyre cover may comprise a pair of annular layers according to the invention disposed circumferentially around the carcass, one adjacent to each side of the tread region.

In a preferred breaker construction, a pneumatic tyre cover comprises a pair of annular layers disposed circumferentially around the carcass adjacent to each side of the tread region and a cord reinforcement layer disposed circumferentially around the carcass and extending from one side of the tread region to the other.

In a preferred filler construction two annular layers in accordance with the invention are provided, the layers being in the form of flat rings extending side-by-side and having a rubber fillet of radially outwardly tapering cross-section interposed between them.

One or more layers may be utilised to form a breaker and when two or more layers are utilised the sinuations of any one layer may be symmetrically displaced circumferentially with respect to the sinuations of any other layer.

Breakers in accordance with the invention may be used in a pneumatic tyre cover in conjunction with a breaker layer or layers of conventional construction, i.e. a layer or layers cut from a length of weftless cord fabric.

The breaker, filler or chafer may be formed from, for example, steel cord, rayon, cotton or nylon and it may be applied to a carcass having cords at 90° to a circumferential line or having plies the cords of which cross one another.

One embodiment of the invention will now be described, with reference to the accompanying drawings, in which:

FIGURE 1 is a diagrammatic plan view of part of a breaker reinforcement according to the invention;

FIGURE 2 is a diagrammatic side view of part of a filler according to the invention;

FIGURE 3 is a diagrammatic cross-sectional end view of the filler shown in FIGURE 2 in the direction shown by the line W—W in FIGURE 2, to a larger scale;

Figure 4:
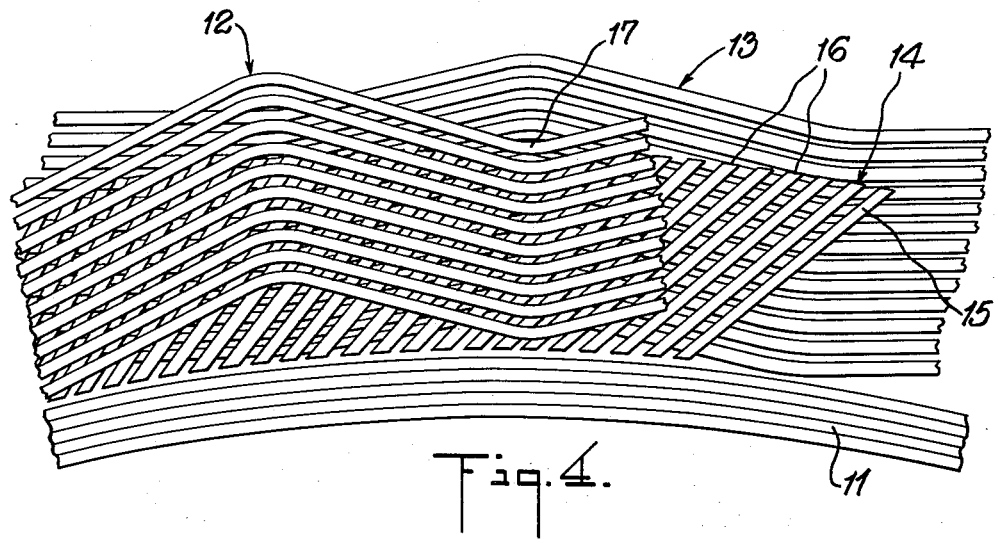
FIGURE 4 is a diagrammatic side view of a second filler construction according to the invention.

The breaker shown in FIGURE 1 comprises a reinforcement 1 of a conventional type for application to a formed carcass, formed from a pair of plies 1a and 1b of rubberised steel cords parallel to one another, the cords 2 in the first ply 1a making an angle of 17° with the circumferential centre line X—X of the breaker, and the cords 3 in the second ply 1b making an angle of 17° with the said line and being oppositely inclined to the said line with respect to the cords 2 in the first ply 1a.

Along the lateral edges Y—Y and Z—Z of the reinforcement 1 annular layers 4 and 5 of rubberised steel cords 6, previously wound on a former, are located, the said layers partly overlapping the edge portion of the reinforcement 1 and partly extending beyond the said edges outwardly of the reinforcement 1. The layer 5 is shown with the cords 6 partly cut-away. The cords 6 in each layer are arranged in the form of a continuous sinuous helix, and lie in successive side-by-side convolutions, each convolution incorporating a plurality of similar sinuations.

The layers 4 and 5 serve to stiffen the shoulder portions of the tyre and thus improve stability and reduce the tendency for rapid tread wear to take place in the shoulder regions. The overlapping by the layers 4 and 5 of the edges Y—Y and Z—Z of the reinforcement 1 serves to produce a gradual reduction of stiffness at the breaker edges and to protect the cut ends of the cords 2 and 3 against the severe flexing of the cover which occurs in the shoulder regions of the cover and which tends to produce failure of the adhesion of the cords to the rubber.

The amplitude A of each sinuation is approximately ⅓ of the overall width W of the layer, and the pitch P of the sinuation is approximately 7.4 times the amplitude A.

In an alternative breaker construction (not illustrated), the entire breaker is formed from convolutions of sinuous windings in the following manner.

The breaker is wound on a collapsible drum of the required diameter for the subsequent application of the breaker to a formed tyre carcass. A first layer of cord is wound on the outer peripheral surface of the former in successive side-by-side convolutions, the amplitude of the sinuations in the unformed state being about ³⁄₂₀ of the width of the layer and the pitch of the sinuations being about 4½ times their amplitude.

The value decided upon for the pitch and the amplitude of the sinuations in the unformed state is governed by (a) The amount of stretch which the breaker will be subjected to if it is to be formed from the cylindrical shape to the characteristic U-shaped cross-sectional shape of a tyre.

(b) The values required in the formed tyre.

(c) The number of layers to be used and the relative disposition of the layers with respect to each other since this governs the depth of the scallop-shaped indentations formed at the edges of the breaker by the sinuous nature of the winding, excessive depth being undesirable.

A second similar layer is wound upon the first layer, the second layer being circumferentially displaced relative to the first layer by ⅓ of a pitch.

A third similar layer is then wound upon the first two layers and is circumferentially displaced relative to the second layer by a further ⅓ of a pitch. Six ends of wire cord, only, are thus present in the breaker, i.e., the ends of cord at the commencement and the finish of each of the layers, the danger of ply looseness developing as a result of breakdown of the rubber to wire cord bond at the cord ends being consequently very considerably less than the danger present in a cover incorporating a steel cord breaker cut from ply fabric.

The wound breaker is removed from the former and accurately applied symmetrically to a carcass formed up to the shape and size it assumes prior to insertion in a mould. A tread is superposed upon the wound breaker, the assembled cover located in a mould and subsequently fully shaped, moulded and vulcanised.

It will be appreciated that the breaker formed as described above is provided with a smooth edge which is scallop-shaped on account of the sinuations, while the breaker increases in thickness and in strength to a maximum value in the region of the mid-circumferential line since the thickness increases from one layer to two overlapping layers and then finally three overlapping layers in the said region.

If desired, the layers can be separated by sheets of rubber of any desired thickness, the hardness of the rubber, in the case of a single layer breaker or a filler or chafer being up to 80 Shore and in the case of breakers of two or more layers, up to 63 Shore.

In the manufacture of a filler or chafer according to the invention, the sinuous winding is formed upon a horizontally disposed disc at substantially the diameter it will assume in the finished cover.

In the case of the manufacture of the filler, a bead wire covered with rubberised fabric is located in a recess in the disc, the winding being formed upon and extending radially beyond the covered bead wire.

The filler shown in FIGURES 2 and 3 comprises two layers 7 and 8 of steel cords 9 wound as described above, the layers having a rubber fillet 10 of triangular cross-section interposed between them (shown in FIGURE 3 only). The layers 7 and 8 are offset circumferentially with respect to one another by half a pitch. A bead-wire assembly 11 is located coaxially and radially within the layers 7 and 8.

Whereas with conventional steel cord fillers, cut from tyre building fabric, there is a tendency for ply separation to develop adjacent to the filler edge on account of both the sudden weakness formed at the filler edge and the pounding of the carcass plies upon the individual cord ends of the filler, the fillers of the invention considerably reduce this tendency since the margins of the filler are of graded thickness, are scallop-shaped and do not have or have only a few cord ends.

In alternative filler constructions, reinforcements according to the invention may be used in conjunction with conventional filler reinforcements. For example, a filler as shown in FIG. 4 may be constructed from two sinuous strips 12 and 13 having a strip 14 of parallel-cord fabric sandwiched between them, the cords 15 of the parallel-cord strip 14 lying at an angle of 45° to the length of the strip. The radially outermost cord ends 16 of the parallel cord strip are arranged to lie radially within the innermost indentations 17 of the scallop-shaped radially outer edges of the sinuous strips.

Figure 5:
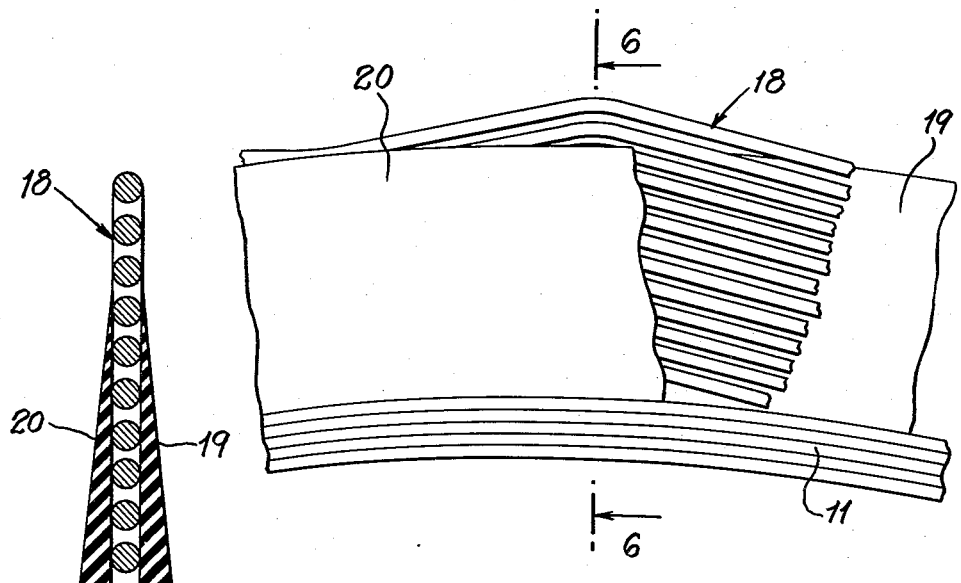
FIGURE 5 is a view similar to FIG. 4 of a third filler construction according to the invention, a part being broken away to show an interior formation.
Figure 6:
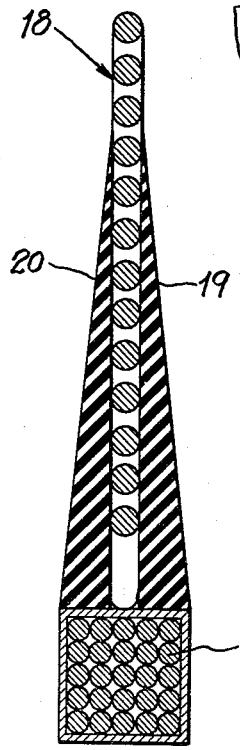
FIGURE 6 is a cross section on a larger scale of the third filler taken in the direction of the line 6—6 of FIG. 5.

In a further alternative filler construction shown in FIGS. 5 and 6, a reinforcement according to the invention is arranged in the form of a flat ring 18 and sandwiched between two rubber annuli 19 and 20 of triangular cross-section to obtain the required tapering cross-section.

Chafer strips according to the invention may be applied to the bead region of a tyre carcass in the conventional manner, except that it is not necessary for the strip to be wrapped around the heel of the bead region since the circumferential nature of the winding resists the tendency for the strip to move radially outwardly during moulding.

It will be appreciated that the reinforcement constructions forming the subject-matter of this invention may be manufactured by mechanical winding apparatus, thus eliminating a considerable amount of manual labour when compared with that required to make a corresponding conventional reinforcement by the manufacture of ply fabric and the cutting of suitable lengths for a reinforcement.

Having now described our invention, what we claim is:

1. A filler for a tyre carcass comprising an annular rubber fillet having faces tapering radially outwardly to an edge and having on each radial face concentric, sinuous, convolutions side-by-side in a common plane adjacent to each side of said fillet, each convolution being of filamentary material and having sinuations spaced uniformly throughout its circumference from adjacent convolutions, the diameter of each convolution being greater than the diameter of the adjacent convolution nearer the common center of the convolutions, the phase of the sinuations on one side of the fillet being the reverse to the phase of the sinuations on the other side of the fillet, said convolutions extending outwardly beyond the outer periphery of the fillet.

2. A pneumatic tyre cover having a bead wire in each bead, an annular rubber fillet in each bead having an inner periphery abutting said bead wire and having side faces tapering radially outwardly to an edge and having on each side face concentric, sinuous, convolutions side-by-side in a common plane adjacent to each side of said fillet, each convolution being of filamentary material and having sinuations spaced uniformly throughout its circumference from adjacent convolutions, the diameter of each convolution being greater than the diameter of the adjacent convolution nearer the common center of the convolutions, the phase of the sinuations on one side of the fillet being reverse to the phase of the sinuations on the other side of the fillet, said convolutions extending outwardly beyond the outer periphery of the fillet.

3. A beaded tyre cover incorporating in the bead region a filler comprising two layers of filamentary material, each layer comprising a plurality of concentric, sinuous convolutions of said material, the convolutions in each layer extending in side by side relationship in a common plane, adjacent convolutions being spaced uniformly throughout their respective circumferences, the diameter of each convolution being greater than the diameter of the adjacent convolution disposed nearer the axis of the tyre, the layers being in the form of flat rings extending side-by-side and having a rubber fillet of radially outwardly tapering cross-section interposed between them.

4. A pneumatic tyre cover incorporating a filler comprising an anular layer of filamentary material in the form of a plurality of concentric, sinuous, convolutions, said convolutions extending in side-by-side relationship in a common plane, adjacent convolutions being spaced uniformly throughout their respective circumferences, the diameter of each convolution being greater than the diameter of the adjacent convolutions disposed nearer the axis of the tyre, said layer being in the form of a flat ring having on each side a rubber fillet of radially outwardly tapering cross-section.

5. A pneumatic tyre cover incorporating two annular layers of filamentary material, each layer comprising a plurality of concentric, sinuous convolutions of said material, the convolutions in each layer extending in side-by-side relationship in a common plane, adjacent convolutions being spaced uniformly throughout their respective circumferences, the diameter of each convolution being greater than the diameter of the adjacent convolution disposed nearer the axis of the tyre, the sinuation of each layer being symmetrically displaced circumferentially, the layers having interposed therebetween an annular reinforcement of cords each of the said cords making an angle of about 45° with a radial line crossing the cord, the annular reinforcement lying radially within the radially outermost edges of the said annular layers.

6. A beaded pneumatic tyre comprising a chafer in each bead region, said chafer comprising an annular layer formed from a plurality of concentric, sinuous, convolutions of filamentary material, said convolutions extending in side-by-side relationship in a common plane, adjacent convolutions being spaced uniformly throughout their respective circumferences, the diameter of each convolution being greater than the diameter of the adjacent convolution disposed nearer the axis of the tyre, and each convolution incorporating a plurality of sinuations, said sinuations lying substantially in the common plane of the convolutions so that the annular layer has a sinuous edge.

7. A pneumatic tyre according to claim 3 wherein the pitch of each sinuation is greater than the amplitude of the sinuations.

References Cited in the file of this patent
UNITED STATES PATENTS

| | | |
|---|---|---|
| 1,800,179 | Darrow | Apr. 7, 1931 |
| 1,842,353 | Lorentz | Jan. 19, 1932 |
| 2,179,374 | Kraft | Nov. 7, 1939 |
| 2,225,042 | Elliott | Dec. 17, 1940 |
| 2,947,340 | French | Aug. 2, 1960 |

FOREIGN PATENTS

| | | |
|---|---|---|
| 726,810 | Great Britain | Mar. 23, 1955 |
| 549,302 | Italy | Oct. 12, 1956 |
| | (Corresponding English language patent, Great Britain, 815,055, June 17, 1959) | |
| 768,478 | Great Britain | Feb. 20, 1957 |
| 1,140,534 | France | Mar. 4, 1957 |